May 24, 1960 H. J. B. HERBRUGGEN 2,937,420
AUTOMATIC STACK MOLDING APPARATUS AND SYSTEM
Filed Oct. 18, 1956 13 Sheets-Sheet 1

INVENTOR.
HEINRICH J. B. HERBRUGGEN
BY
ATTY.

May 24, 1960 H. J. B. HERBRUGGEN 2,937,420
AUTOMATIC STACK MOLDING APPARATUS AND SYSTEM
Filed Oct. 18, 1956 13 Sheets-Sheet 2

INVENTOR.
HEINRICH J.B. HERBRUGGEN
BY
ATTY.

May 24, 1960 H. J. B. HERBRUGGEN 2,937,420
AUTOMATIC STACK MOLDING APPARATUS AND SYSTEM
Filed Oct. 18, 1956 13 Sheets-Sheet 3

INVENTOR.
HEINRICH J. B. HERBRUGGEN
BY
ATTY.

May 24, 1960 H. J. B. HERBRUGGEN 2,937,420
AUTOMATIC STACK MOLDING APPARATUS AND SYSTEM
Filed Oct. 18, 1956 13 Sheets-Sheet 4
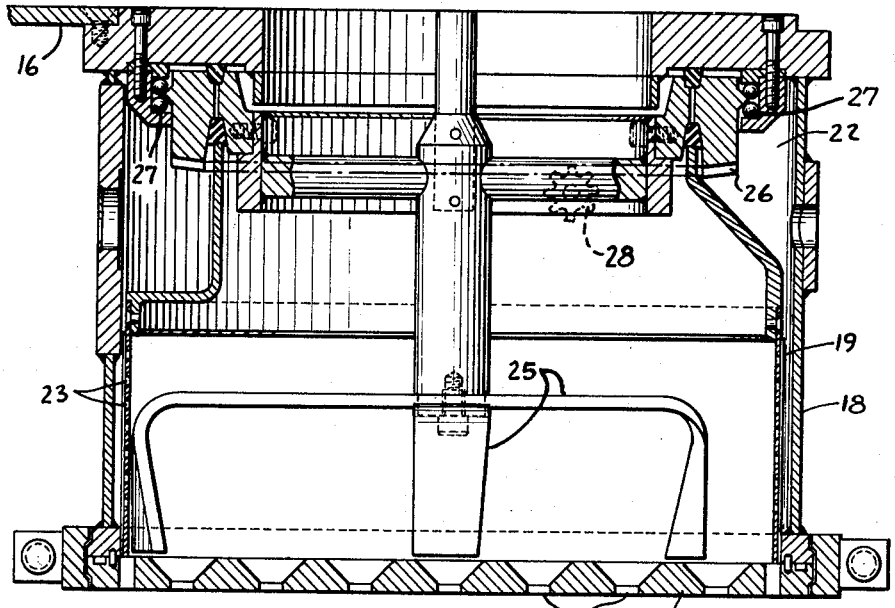
Fig. 6
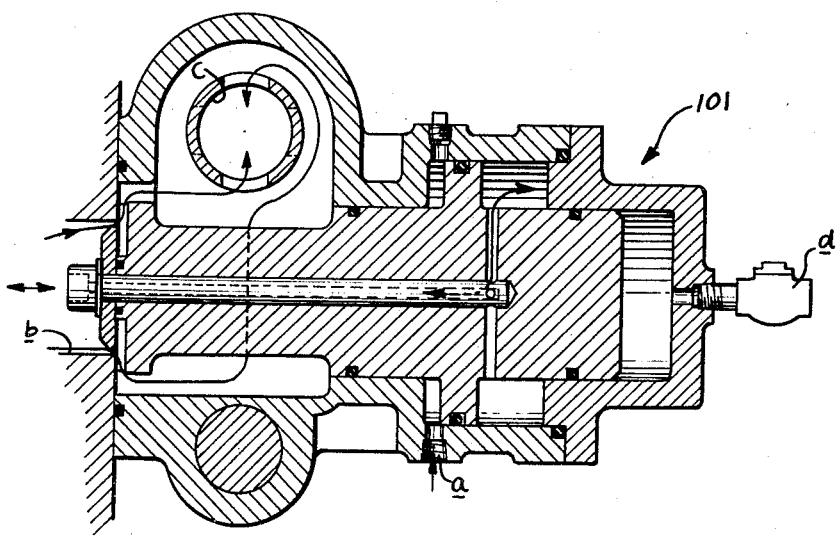
Fig. 7
INVENTOR.
HEINRICH J. B. HERBRUGGEN
BY
ATTY.

May 24, 1960 H. J. B. HERBRUGGEN 2,937,420
AUTOMATIC STACK MOLDING APPARATUS AND SYSTEM
Filed Oct. 18, 1956 13 Sheets-Sheet 6

INVENTOR.
HEINRICH J.B. HERBRUGGEN
BY
ATTY.

INVENTOR.
HEINRICH J.B. HERBRUGGEN
BY
ATTY.

May 24, 1960 H. J. B. HERBRUGGEN 2,937,420
AUTOMATIC STACK MOLDING APPARATUS AND SYSTEM
Filed Oct. 18, 1956 13 Sheets-Sheet 8

INVENTOR.
HEINRICH J. B. HERBRUGGEN
BY
ATTY.

May 24, 1960    H. J. B. HERBRUGGEN    2,937,420
AUTOMATIC STACK MOLDING APPARATUS AND SYSTEM
Filed Oct. 18, 1956    13 Sheets-Sheet 9
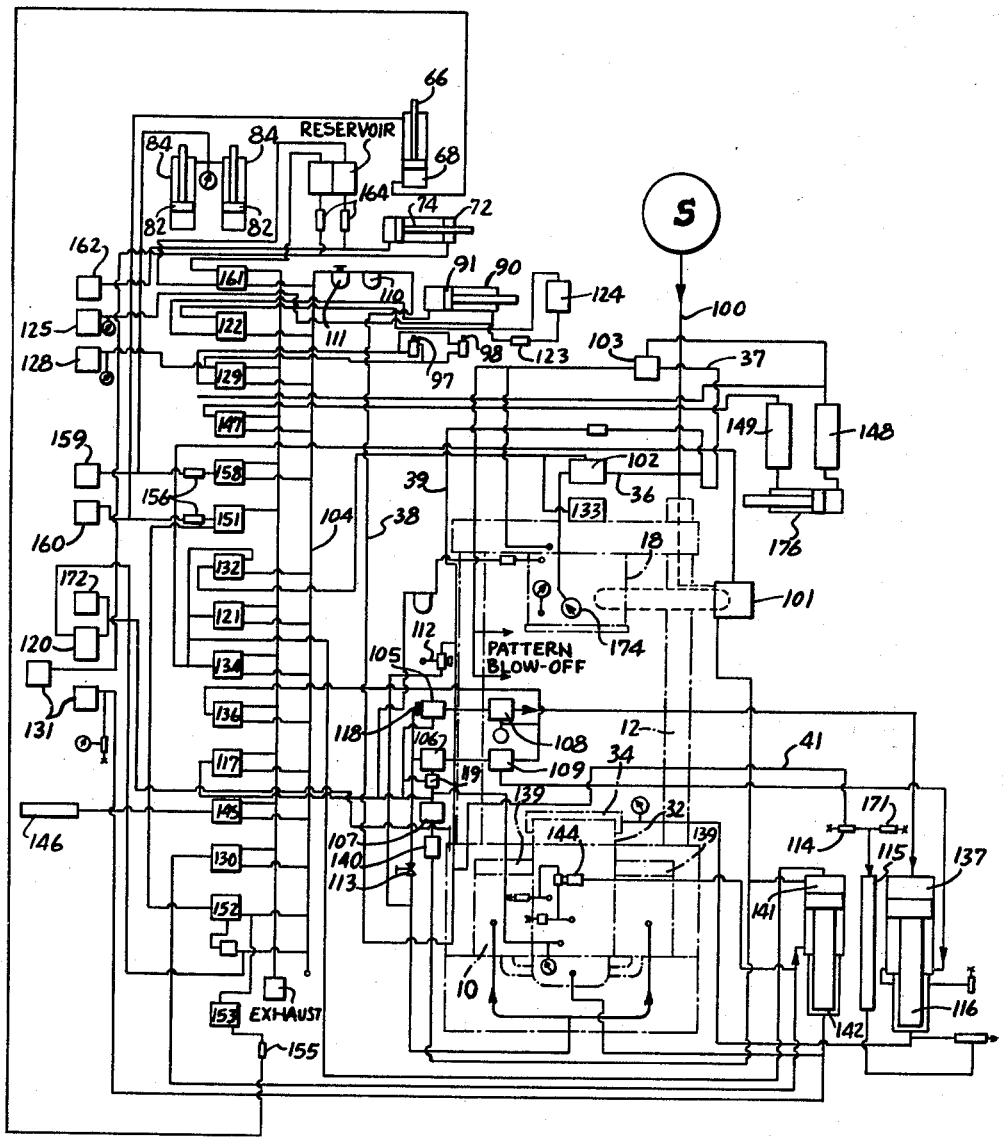
Fig. 23
INVENTOR.
HEINRICH J. B. HERBRUGGEN
BY 
ATTY.

May 24, 1960  H. J. B. HERBRUGGEN  2,937,420
AUTOMATIC STACK MOLDING APPARATUS AND SYSTEM
Filed Oct. 18, 1956  13 Sheets-Sheet 12

INVENTOR.
HEINRICH J.B. HERBRUGGEN
BY
ATTY.

May 24, 1960     H. J. B. HERBRUGGEN     2,937,420
AUTOMATIC STACK MOLDING APPARATUS AND SYSTEM
Filed Oct. 18, 1956     13 Sheets-Sheet 13

INVENTOR.
HEINRICH J.B. HERBRUGGEN
BY
ATTY.

United States Patent Office 2,937,420
Patented May 24, 1960

2,937,420

AUTOMATIC STACK MOLDING APPARATUS AND SYSTEM

Heinrich J. B. Herbruggen, Cleveland, Ohio, assignor, by mesne assignments, to Pettibone Mulliken Corporation, a corporation of Delaware Filed Oct. 18, 1956, Ser. No. 616,892

6 Claims. (Cl. 22—10)

This invention relates generally to an apparatus and system for automatically blowing and stacking sand cores and molds, and more particularly relates to an apparatus and system for automatically positioning and clamping a sand receptacle in operative position for receiving a charge of sand from a sand charging mechanism, pneumatically charging the receptacle with sand, squeezing or packing the charge of sand in the receptacle, then removing the receptacle from the sand charging mechanism and stacking the completed mold or core for pouring, and automatically repeating the cycle a predetermined number of times.

A conventional core or mold making apparatus is usually provided with a sand charging mechanism which is adapted to be supplied with sand from a supply hopper and thereafter pneumatically discharge the sand into a sand receiving receptacle such as a mold flask or core box. The sand receptacle is usually supported upon a table or platform which positions the receptacle into operative sand transfer engagement with the charging mechanism. After the receptacle is charged with sand, a squeeze plate packs the sand therein. The table or platform is then lowered and the completed core or mold is removed from the apparatus.

Where only a few cores or molds of a particular type are desired the operation of the apparatus is usually manually controlled so that the timing of the various operations can be regulated in accordance with the requirements of the particular core box or mold flask utilized. However, where it is desired to make a great many identical cores or molds, it is preferred to automatically control the operation of the apparatus in order to save labor, to increase the speed of operation, to eliminate inaccuracies resulting from manual control that might alter the uniformity of the cores or molds being produced and also to permit a more efficient utilization of apparatus and space. With such an automatically controlled arrangement, the alignment and various adjustments in the apparatus can be predetermined and set for the particular core or mold desired, and a larger number of empty core boxes or mold flasks can be successively fed into the apparatus and a plurality of completed cores or molds discharged and stacked for pouring; the operation being terminated only when the desired number of cores or molds is attained or to replenish the sand supply in the supply hopper.

Accordingly, the principal objects of this invention are to provide a simple, compact and easily operable system for automatically actuating the various operative components of the apparatus in a predetermined sequence; to provide an improved apparatus and system for automatically repeating the operative cycle of receiving an empty core box or mold flask, forming a core or mold therein and then discharging and stacking the completed core or mold without interruption; and also to provide a core or mold making apparatus which is relatively simple in construction, easily adjustable for different types of work, and efficient in operation and utilization of space.

Other objects of the improved apparatus and system relate to the provision of an improved mechanism for transporting and loading empty core boxes or flasks into the apparatus and for removing and stacking the completed core or mold after completion of each cycle of operation.

Additional objects of the invention relate to the provision of an improved mechanism for simultaneously positioning an empty core box or mold flask in operative relation to the sand charging mechanism while removing a completed core box or mold flask from the sand charging apparatus.

Still other objects and advantages of the invention will become more apparent to persons skilled in the art from the following detailed description of the preferred embodiments of the invention as shown in the accompanying drawings, in which:

Fig. 6 is a vertical section through the sand transfer chamber which may be readily adapted for use with either of the forms shown in Figs. 1 and 3;

Fig. 7 is a sectional view of a valve mechanism for admitting pneumatic pressure to the sand charging mechanism in the apparatus of Fig. 1;

Fig. 23 is a diagrammatic illustration of the pneumatic and hydraulic portion of the control system for automatically operating the various components of the form of apparatus shown in Fig. 1 of the drawings in predetermined sequence;

General description

Figure 1:
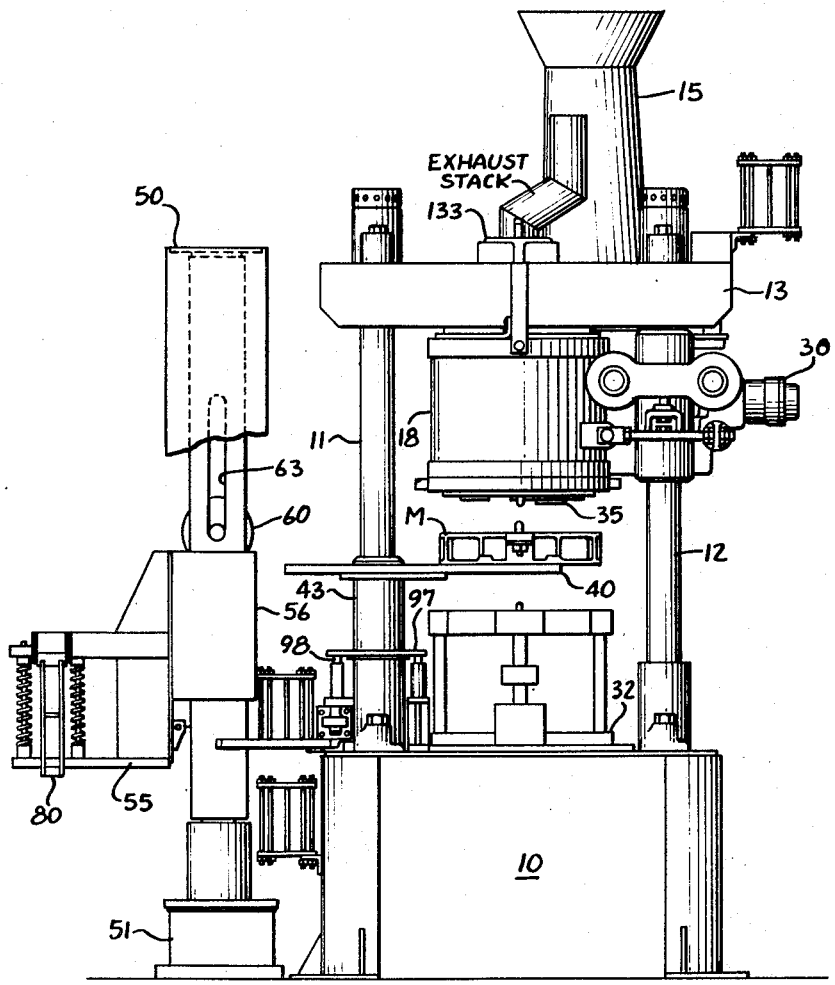
Fig. 1 is a vertical elevation of one form of the apparatus constructed in accordance with this invention.
Figure 2:
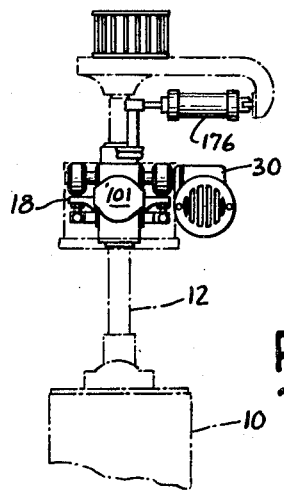
Fig. 2 is a partial side elevation of the apparatus of Fig. 1 illustrating the mounting of the sand charging mechanism for swinging movement on the supporting frame.

Referring now more particularly to Figs. 1, 2, 3 and 4 of the drawings, there is shown generally an apparatus for blowing sand into the core boxes or mold flasks in accordance with this invention. The form of apparatus illustrated in Figs. 1 and 2 is substantially the same as the form of apparatus illustrated in Figs. 3 and 4, with the principal exception that the apparatus in Fig. 1 has a sand supply hopper disposed to one side of the frame and a sand transfer chamber is mounted on the frame for swinging movement to and from the supply hopper, whereas, in the form of apparatus shown in Fig. 3, the supply hopper is mounted on the cross-head of the frame directly over a fixed sand transfer chamber.

In each case, the apparatus embodies an overhead frame including a base 10 which supports spaced vertical columns 11 and 12 interconnected at the top by a crosshead 13 and defining a work area therein within which the sand blowing operation takes place.

Also in each case, a supply hopper 15 containing sand is mounted at the top of the frame and has a discharge opening at the bottom which is normally closed by a movable gate 16 which controls the supply of sand to a sand transfer chamber 18. The detailed construction of the sand transfer chamber 18 is best shown in Fig. 6, and is in the form of a hollow cylindrical member open at the top and having an annular baffle 19 of lesser diameter concentrically mounted therein. The sand transfer chamber is provided with a removable base in the form of a blow plate 20 having several sand discharge openings 21 which are adapted to communicate with a core box or mold flask cavity that may be operatively supported in sand receiving position thereneath. The baffle 19 forms a sand room within the transfer chamber and the space between the baffle and the external cylindrical wall of the transfer chamber provides an air space 22 by means of which air under pressure may be admitted through a plurality of openings 23 in the baffle to the sand room.

The sand chamber 18 is also provided with an agitating member 25 having circumferentially spaced stirring elements which are carried by a ring gear 26 operatively supported on bearings 27 within the air space for rotation along the top edge of the baffle 19. A pinion 28 coacts with the ring gear 26 within the air space to drive the ring gear and to rotate the stirring elements. The pinion 28 is driven by a suitable electric motor, such as 30 in Fig. 2.

In the form of apparatus of Fig. 1, the supply hopper 15 is position to one side of the frame and hence the sand transfer chamber 18 is shown rotatably supported on one of the vertical columns 12 for swinging movement from a position within the work area to a position beneath the supply hopper where it may be charged with sand. In the form shown in Fig. 3 of the drawings, the supply hopper 15 is located on the crosshead 13 above the sand transfer chamber which is mounted on the vertical columns in fixed position beneath the crosshead and in alignment with the supply hopper.

In vertical alignment with the sand transfer chamber 18 and beneath its operative position within the frame is a table 32 which can be positioned vertically to clamp a core box or mold flask in tight operative engagement with its sand receiving cavity disposed directly beneath the discharge openings 21 in the transfer chamber blow plate. A supplementary squeeze ram 34 can be independently activated to pack and squeeze the sand in the core box or mold flask against a drag pattern 35 carried by the blow plate. In the preferred forms of the apparatus shown in Figs. 1 and 3 of the drawings, the lift table 32 and the squeeze ram 34 are hydraulically positioned and the positioning mechanism is contained for the most part within the base 10 of the apparatus for operation in a manner that will be hereinafter more fully described.

Figure 4:
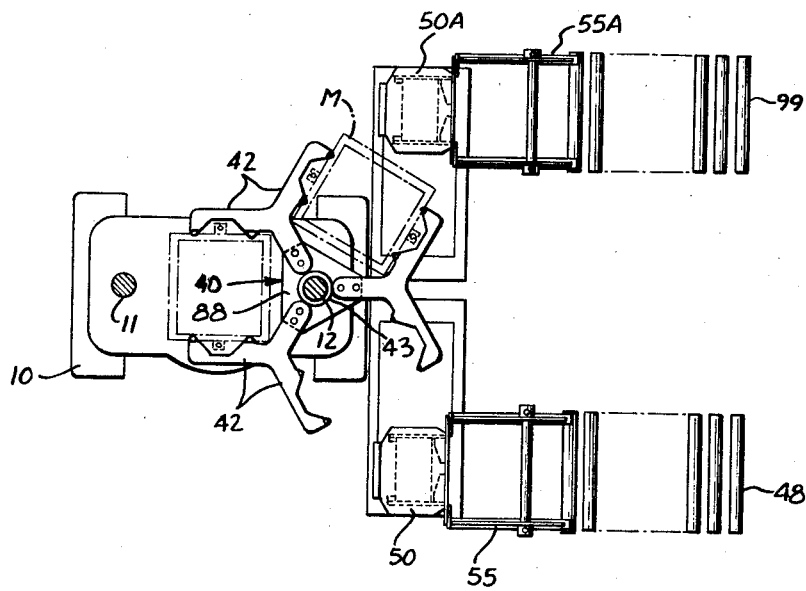
Fig. 4 is a sectional view taken along the line 4—4 in Fig. 3 of the drawings to illustrate the mechanism for simultaneously loading and removing the core boxes or mold flasks into and away from operative relation to the sand charging mechanism respectively.
Figure 3:
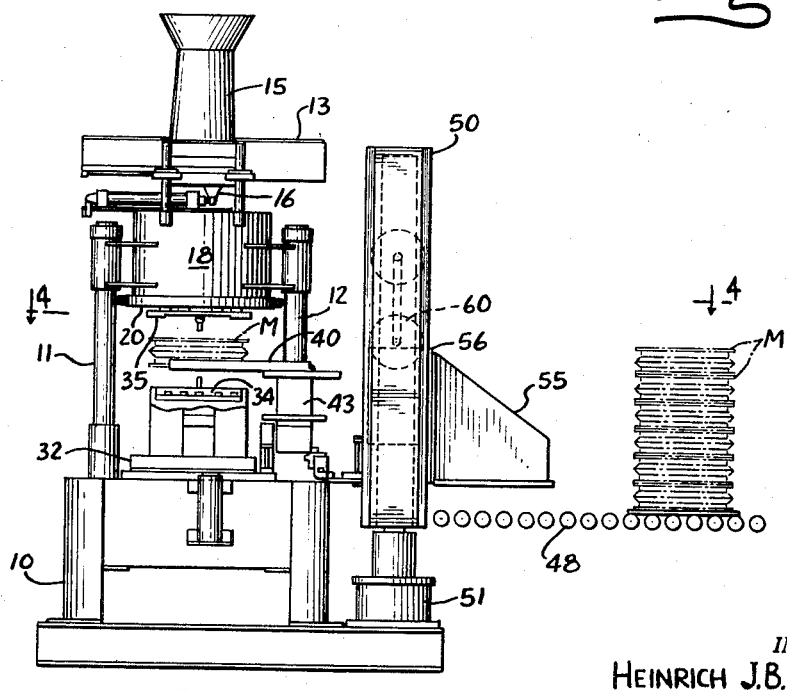
Fig. 3 is a side elevation of another preferred form of the apparatus constructed in accordance with this invention wherein the sand charging mechanism is fixed on the apparatus frame.
Figure 5:
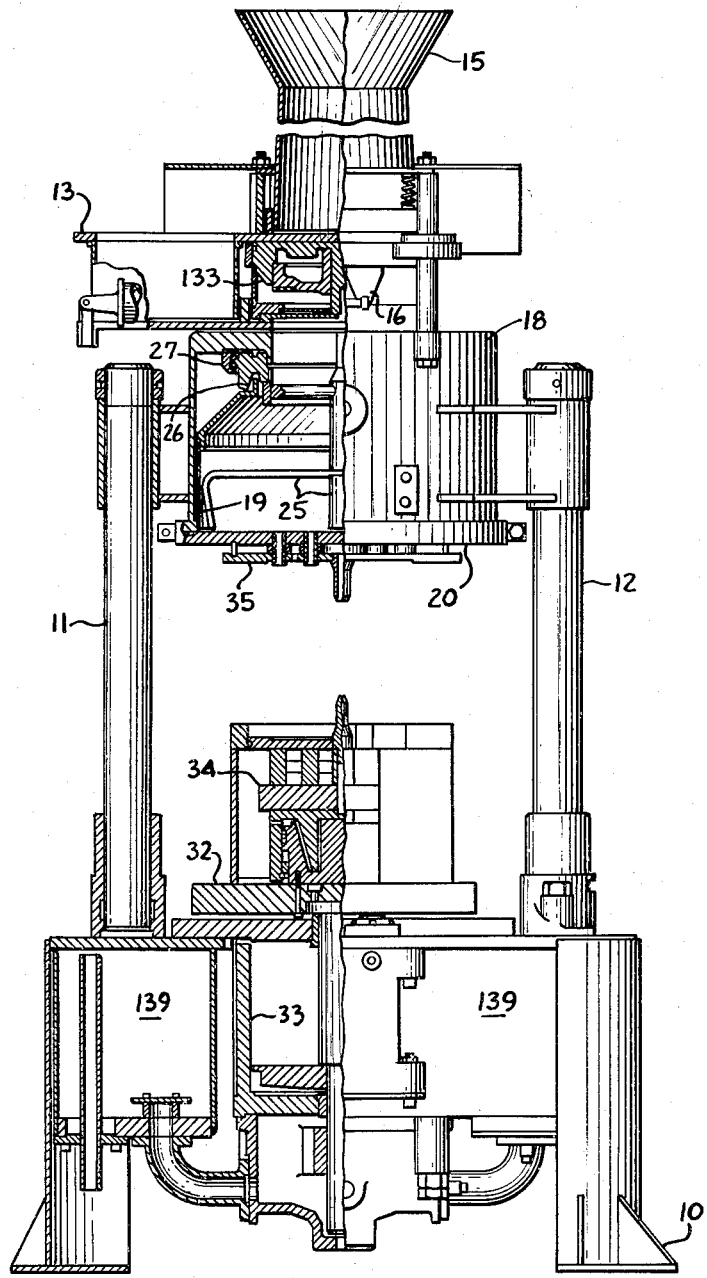
Fig. 5 is an enlarged side elevational view, partly in section, of the form of apparatus shown in Fig. 3.

As best shown in Figs. 1, 3 and 4 of the drawings, each form of apparatus includes a turntable mechanism 40 for positioning an empty core box or flask into the work area and also for simultaneously removing a completed mold or core box from the work area. In the preferred forms shown, this arrangement includes a plurality of circumferentially spaced arms 42 which are carried by a suitable sleeve 43 journaled on one of the columns 12 for rotation on a vertical axis; successive pairs of the arms 42 being arranged to support a core box or flask on suitable aligning pins 44 thereon (see Fig. 10). The positioning of this turntable 40 and the correct alignment of the arms 42 in the various operative positions is accomplished by a fluid actuated indexing mechanism which will be hereinafter more fully described.

Empty core boxes and mold flasks may be manually transported and loaded onto the turntable 40 and manually removed and stacked after blowing of the core or mold or they may be automatically transported onto and removed from the turntable and stacked by means of a suitable transporting or stacking mechanism 50 best shown in operative relation to the apparatus in Figs. 1, 3 and 4 of the drawings. In the form of the apparatus shown in Fig. 1 of the drawings, it is intended that an operator may manually transport and load the empty core boxes and flasks onto the turntable 40, whereas the completed cores and molds will be removed from the turntable and stacked to one side of the apparatus automatically by utilizing one of the stacking mechanisms on the discharge side of the apparatus. Substantially the same mechanism is utilized in the form of apparatus in Fig. 3 for automatically transporting and loading the apparatus as for discharging and stacking completed core or molds from the apparatus, except that the sequence of operation is initiated and controlled respectively in accordance with the particular work function that the mechanism performs on the loading or the discharge side of the apparatus in a manner that will be hereinafter more fully described.

Stacking mechanism

The details of the stacking mechanism are best illustrated in Figs. 11 through 19 of the drawings inclusive and is shown as including a base portion 51 disposed adjacent a core box or flask discharge conveyor 48 which supports a pair of vertically disposed channel members 52 and 53 forming a vertical trackway for guiding a stacking arm 55. The stacking arm 55 is supported on a box-like carriage 56 having internal rollers 57 which are adapted to engage the side flanges of the vertical channel members so that the stacking arm 55 may be easily positioned vertically along the channel members. Vertical movement of the stacking arm carriage 56 is accomplished by connecting the carriage to one end of a flexible cable 58 or the like which extends over a pulley wheel 60 disposed between the vertical guide channels; the other end of the cable being anchored to a counter-balancing spring 59 fixed adjacent the lower end of the channels.

The pulley wheel 60 is journaled for rotation on a shaft 61 whose opposite extremities are slidably disposed in vertically extending guide slots 62, 63 in each channel member respectively so that the entire pulley wheel assembly can be positioned vertically within the limits of the slots. The pulley wheel assembly is mounted in a cage 65 which is coupled at its lower end to the piston rod 66 of a fluid motor having a cylinder 68 whose lower end is pivotally anchored to a bracket 69 mounted on the base of the stacking mechanism. Thus, controlled actuation of the fluid motor will selectively position the pulley cage 65 upwardly or downwardly along the guide slots 62 and 63 and thereby, through the medium of the cable 58, lift or lower the stacking arm 55 along the vertical channels.

Figure 11:
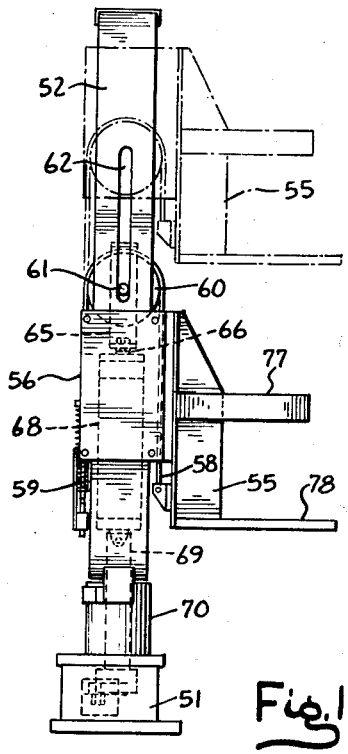
Figs. 11 and 12 are side and front elevations respectively of the mechanism utilized for transporting empty core boxes or mold flasks to the apparatus or for removing and stacking completed core boxes or mold flasks after the cycle of operation is completed.
Figure 12:
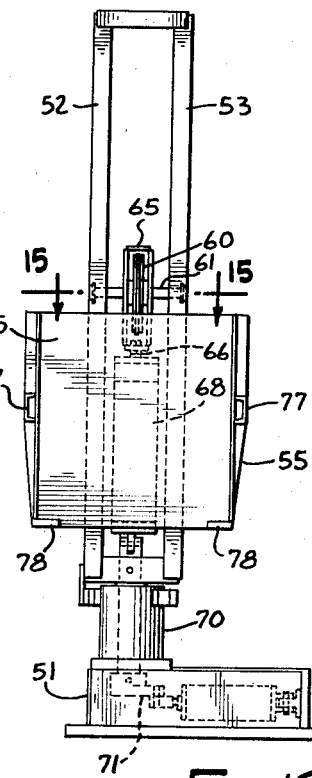
Figure 13:
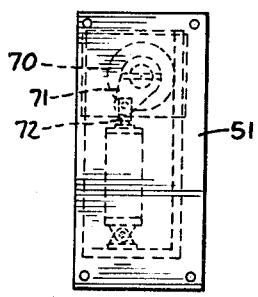

As best shown in Figs. 11, 12 and 13 of the drawings, the vertical trackway formed by the channel members 52 and 53 is rotatably journaled in a vertically disposed sleeve 70 mounted on the base 51 and has its lower extremity coupled through a crank arm 71 to the piston rod 72 of another fluid motor. Actuation of the piston rod 72 will thus rotate the vertical trackway together with the stacking arm; the length of the stroke of the piston rod 72 in the preferred form being adjusted to provide for approximately 120° angular rotation, whereby the stacking arm 55 can be positioned into a position overlying the adjacent turntable arm 42 to load or remove a core box or mold flask onto or from the turntable 40. Thereafter, the stacking arm 55 may be rotated back to its original position adjacent the conveyor 48.

Figure 18:
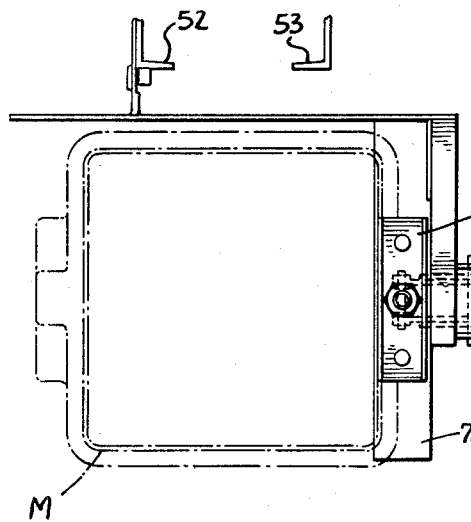
Fig. 18 is a partial plan view of the flask supporting arm of Fig. 17 of the drawings.
Figure 17:
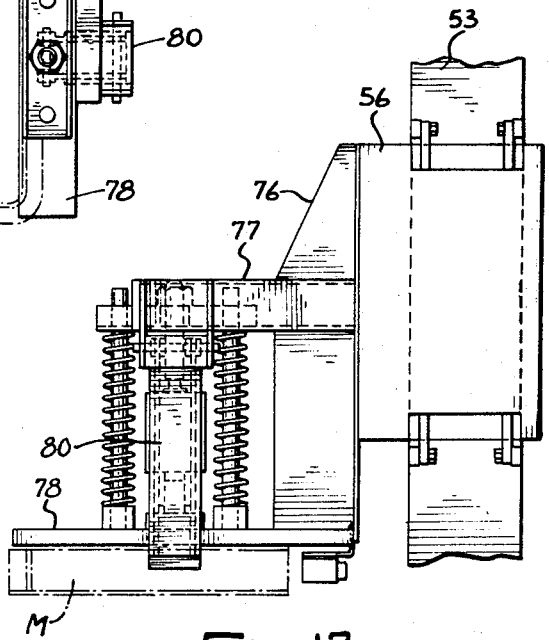
Fig. 17 is an enlarged partial side view of the flask supporting arm of the transporting or stacking mechanism of Fig. 11.
Figure 19:
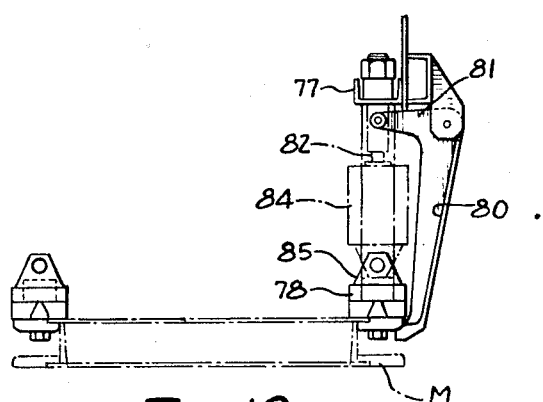
Fig. 19 is a front elevation of a portion of the flask supporting arm of Fig. 17 illustrating the disposition of a clamping device for releasably supporting a core box or mold flask thereon.
Figure 20:
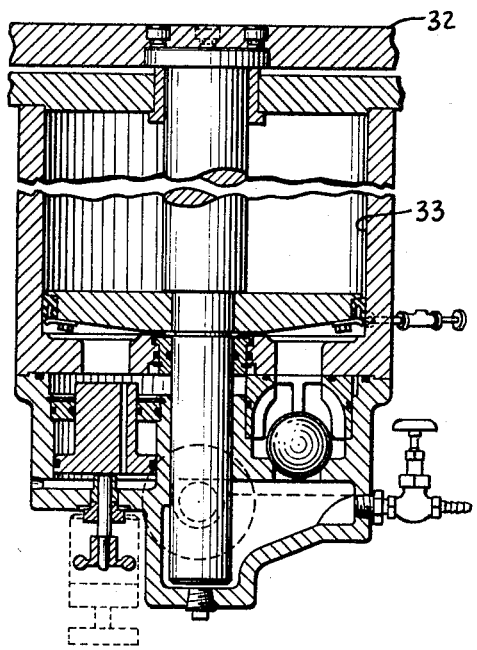
Fig. 20 is a vertical section through the base of the apparatus illustrating in detail the construction of the hydraulic lift for positioning the core box or mold flask into engagement with the sand charging mechanism.

The manner in which a core box or mold flask is picked up, carried and discharged by the stacking arm 55 will be better understood by reference to Figs. 17 through 19 inclusive, wherein the stacking arm construction is shown in greater and enlarged detail. The stacking arm 55 is shown as including a vertically disposed panel 75 mounted on the carriage 56 and having side flanges 76 supporting vertically spaced and horizontally disposed side arms 77 and 78 on each side, one side only being shown in Figs. 17 through 19 for convenience. The upper side arms 77 on each side carry pivoted flask clamps 80 each of which has a lever portion 81 pivotally coupled to a piston rod 82 which is spring-biased in one direction to move the clamps inwardly to grasp the flange edge of a core box or mold flask and which is actuated by fluid pressure in the other direction to release the flanged edge of the core box or mold flask. The cylinder 84 of the fluid motor which actuates the flask clamp piston 82 is pivotally anchored at its lower extremity to suitable brackets 85 on the lower side arms 78.

Thus, in operation, when the stacking arm 55 is lowered on the loading side of the apparatus, adjacent an empty core box or mold flask, the clamp piston 82 is actuated so that the flask clamps 80 are pivoted outwardly until the marginal boundary of the stacking arm engages the top of the empty core box or flask, whereupon the flask clamps 80 are released so that they grasp the marginal flange of the core box or flask and, thereafter the stacking arm 55 is raised vertically along the guide trackway and rotated into loading position with the core box or flask disposed above the aligned pins 44 on the turntable arms 40. The stacking arm is then lowered and the flask clamps 80 are opened and the empty core box or flask is released onto the turntable 40, being guided by the pins 44. There, the stacking arm 55 is raised, rotated back into its original position and lowered for picking up another empty core box or flask. The stacking mechanism operates in a similar though reverse manner on the discharge side of the apparatus in that when the turntable 40 rotates a completed mold or core out of the work area of the apparatus, the stacking arm 55 is rotated into position above the completed core box or mold flask, lowered into engagement with the box or flask, and the flask clamps 80 are positioned to grasp the completed core box or mold flask, after which the stacking arm is raised and rotated into stacking position outside the work area, where it may be lowered until the completed core box or mold flask is located on top of a bottom board or another completed core box or mold flask in a stack. The flask clamps 80 are then operated to release the completed core or mold and the stacking arm returned to receive another completed core box or mold flask from the turntable.

Turntable mechanism

Figure 10:
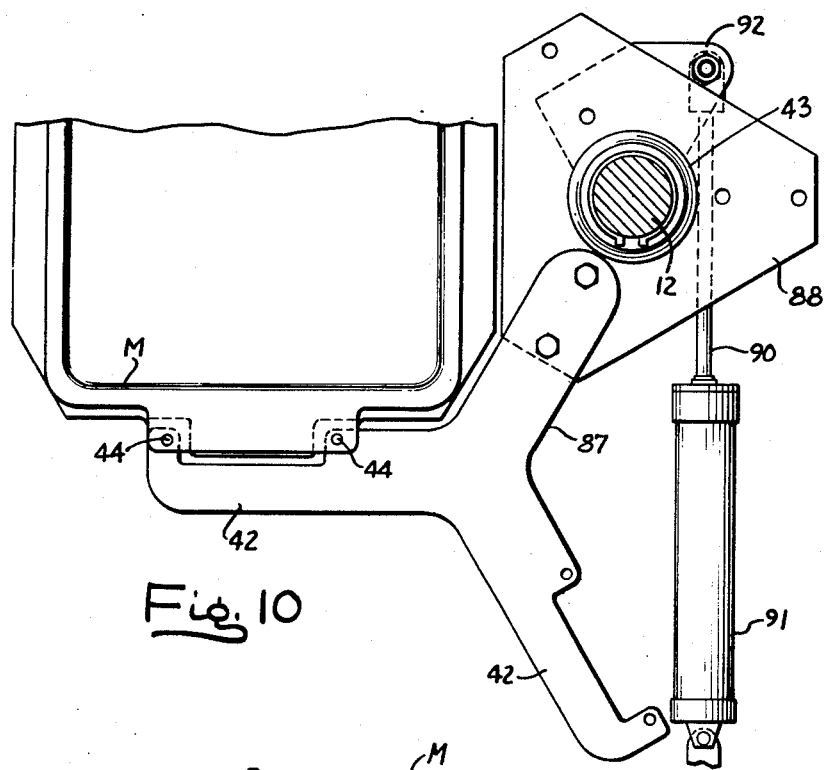
Fig. 10 is a partial plan view of a portion of the turntable and indexing mechanism of Fig. 9.
Figure 9:
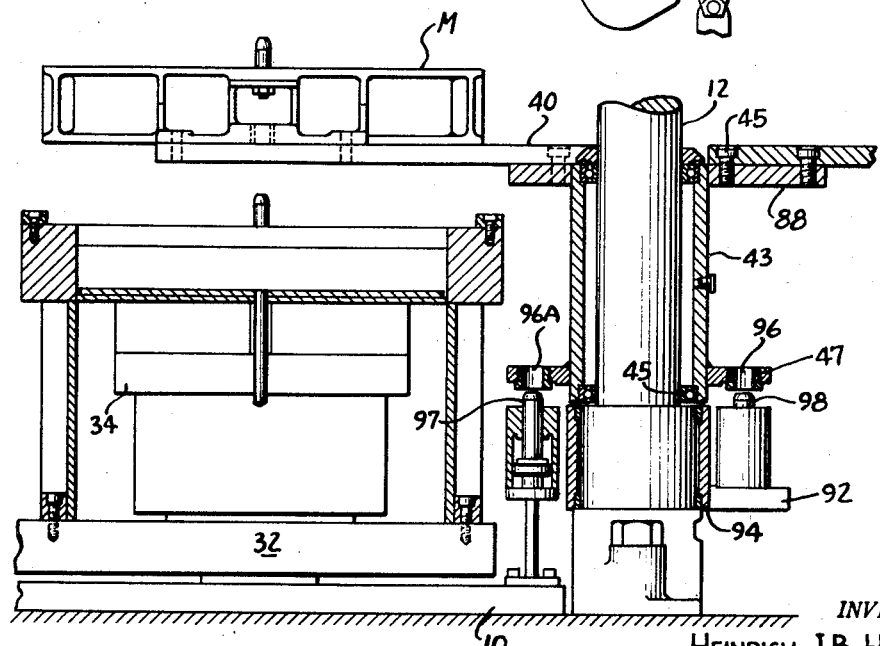
Fig. 9 is a vertical section through the lower portion of the apparatus of Fig. 1 illustrating in greater detail the table construction for lifting the core box or mold flask in operative engagement with the sand charging mechanism, as well as the indexing mechanism for simultaneously positioning and removing a core box or mold flask to and from the sand charging mechanism.
Figure 14:
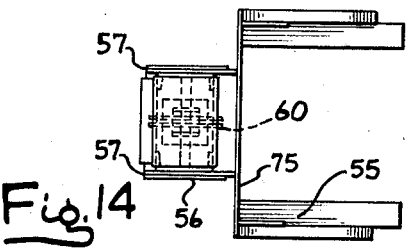
Figs. 13 and 14 are top and bottom plan views respectively of the structure shown in Fig. 11.
Figure 15:
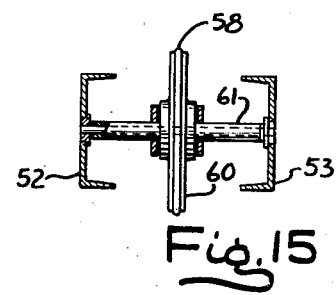
Fig. 15 is an enlarged partial sectional view taken along the lines 15—15 in Fig. 12 of the drawings.
Figure 16:
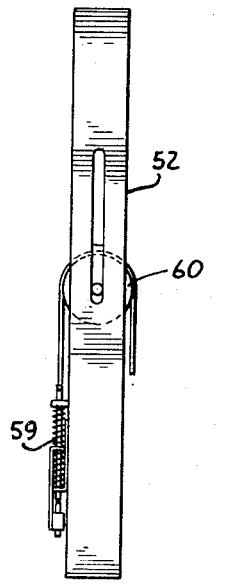
Fig. 16 is a view of a portion of the transporting and stacking mechanism illustrating the counterbalancing mechanism in greater detail.

As previously noted, the turntable 40 embodies a plurality of circumferentially spaced arms 42 carried by the sleeve 43 which is rotatably journaled on one of the vertical columns 12. Referring now more particularly to Figs. 9 and 10 of the drawings, the turntable construction and indexing mechanism is shown in greater detail. The sleeve 43 is journaled on roller bearings 45 at the upper and lower extremities thereof and carries a plate 88 at its upper end which is welded or otherwise secured thereto and which supports the turntable arms 42 thereon. The turntable arms 42 are formed by symmetrically mounting in circumferentially spaced relation and equi-distant from each other the center arms of three Y-shaped members 87 so that the other two arms of each Y-shaped member extend outwardly from the axis of rotation and are disposed at an angle of approximately 120° relative to each other. It is readily apparent that the other Y-shaped members can be secured on the sleeve plate 88 in such manner that the arms 42 of each of the Y-shaped members are parallel with adjacent arms of the adjacent Y-shaped member to form a marginal supporting surface open at the outermost extremity.

Each of the supporting arms 42 carries the aligning pins 44 for engagement with aligning apertures in the core box or flask boundary flanges and are adapted to support a core box or mold flask in operative relation above the plate from within the work area. The open space defined by adjacent parallel arms 42 is designed to pass the lift table 32 therethrough so that the table can engage the bottom edge of the core box or flask and position it upwardly off of the turntable 40 and into engagement with the blow plate 20. The sleeve 43 together with the arms 42 is rotated on the column 12 by coupling the piston rod 90 of a horizontally disposed fluid motor to a crank arm 92 carried by the lower end of another rotatable sleeve 94 journaled on the column 12 below the turntable sleeve 43 and selectively interconnecting the two sleeves for unitary rotation.

This is accomplished by providing an annular flange 47 at the base of the sleeve 43 with circumferentially spaced apertures 96 each carrying a bushing therein for engaging retractable indexing and connecting pins 97 and 98 respectively. These pins have pistons which reciprocate vertically in their enclosed cylinders in response to fluid pressure. The connecting pin 98 is mounted on the crank arm 92 of the lower sleeve 94 and when activated engages an aligned aperture 96 in the lower flange 47 on the turntable sleeve 43, thereby causing the turntable sleeve to rotate with the lower sleeve 94 when the piston 90 is actuated. The indexing pin 97 is mounted on the base 10 of the frame and when activated engages an aligned aperture 96A on the turntable sleeve 43 to prevent further rotation of the turntable sleeve. The apertures 96 are so located relative to each other and the stroke of the piston 92 is so adjusted that the turntable 40 will rotate through 120° for each forward stroke of the piston, thereby assuring that when an empty flask or core box is positioned in the work area, a completed core or mold is positioned adjacent the stacking mechanism 50 for removal and an empty pair of turntable arms 42 is positioned adjacent the loading side of the apparatus.

*General operation*

In general, in the form of apparatus in Fig. 1, empty core boxes or mold flasks are loaded manually onto the turntable 40. However, in the form of apparatus shown in Fig. 3, the stacking mechanism 50A (see also Fig. 4) the suffix A indicating apparatus connected with the loading phase is disposed on the loading side of the apparatus adjacent the feed conveyor 99 and arranged to automatically pick up and deposit empty core boxes or mold flasks on the turntable 40. In the latter case, the stacking mechanism is used as a transporting mechanism wherein an empty core box or mold flask is picked up by the flask clamps 80A and the stacking arm 55A is then raised, rotated through 120° and lowered towards the adjacent turntable arms 42, after which the flask clamps 80A are released to deposit the core box or mold flask on the turntable.

After the empty core box or mold flask is deposited on the turntable 40, the piston 82 is actuated to rotate the sleeve 43 and turntable arms 42 through 120° into the work area above the table and beneath the sand transfer chamber 18. Thereupon, the connection pin 98 is removed from engagement with the turntable sleeve 43 and the indexing pin 97 is engaged in corresponding apertures 96A on the sleeve flange 47 to hold the turntable 40 in fixed position with the core box or flask in the work area. Thereafter, the lift table 32 is actuated to lift the core box or flask upwardly into engagement with the blow plate to receive a charge of sand.

In the preferred form shown herein, sand is supplied under reduced fluid pressure of less than 20 p.s.i. to prefill the core box or flask and thereafter the pressure is increased to full lines pressure of about 100 p.s.i. to complete the blowing operation. After the sand receptacle has been charged with sand the squeeze ram 34 is positioned upwardly and then withdrawn and the flask is lowered onto the turntable arms. While the core box or flask is being lowered, a vibrator mechanism 146 is activated and the box or flask is vibrated during lowering in a manner to be hereinafter more fully described. The turntable 40 is then indexed through another 120° movement to remove the completed mold or core from the work area and to position it adjacent the stacking mechanism 50 for removal from the turntable arms.

The stacking arm 55 of the stacking mechanism 50 is positioned above the completed core box or mold flask and the flask clamps 80 engage the box or flask for removal. The stacking arm 55 is then rotated through 120° to the stacking position and lowered along the guide trackway until the completed core box or mold flask is stacked on top of a stack of similar molds or cores, after which the flask clamps 80 are released and the stacking arm 55 is raised to remove another completed core box or mold flask.

Although each of the components of the apparatus of Figs. 1 and 3 may be activated manually in a desired sequence to produce completed cores or molds, their operation is controlled in accordance with this invention by providing a fluid and an electrical control system which cooperate in response to an operator's direction to automatically repeat a complete cycle of such operations in a predetermined sequence without interruption until a large number of similar cores or molds are produced or until the intervention of some other control or limited factor. The control system is basically the same for each form of apparatus shown in Figs. 1 and 3 and the detailed description will be limited, for exemplary purposes to the form of apparatus shown in Fig. 1. For ease and clarity of description the fluid and electrical positions of the control system will be described separately.

*Fluid system*

Referring now more particularly to Fig. 23, it will be seen that there are a number of solenoid operated valves for controlling the flow of air in the system. These valves are preferably located inside a main control cabinet and are intended to operate from a relatively small air line. The valves which transfer a greater volume of air are preferably located on the apparatus itself, since such valves are more rugged and less vulnerable to damage. Compressed air from a suitable source S of about 100 p.s.i. enters through a main line 100 and is delivered to the inlet port (b) of a blow valve 101. When the blow valve 101 is operated it supplies air to the sand transfer chamber through conduits (c). A branch line 36 connects the main air line 100 with the inlet to a prefill-master valve 102 and another branch line 37 leads to the blower master valve 103. Still another branch line 38 is connected with the main control manifold 104, and with master valves 105, 106 and 107 which control the lift table 32 and the squeeze ram 34, and with control valves 108 and 109, which control a squeeze booster 116. Filters 110 and 111 are provided to protect the solenoid valves. Another branch line 39 leads to the toggle valve 112 which provides an auxiliary lift for the lift table 32 when the gate valve 113 is closed. Another branch line 41 is connected through the needle valve 114 with the oil storage 115 of the squeeze booster 116.

When an empty flask is deposited on the turntable 40, the turntable solenoid valve 122 opens causing air to enter the turntable cylinder 91 so that the empty flask is rotated into position within the frame. The speed of the turntable 40 is regulated by the speed control valve 123 which controls the flow of oil from the oil tank 124 to the opposite side of the turntable piston 90. Pressure switch 125 is then activated to energize the index solenoid valve 129 which supplies air to the index circuit to cause index pin 97 to engage and hold the turntable sleeve 43 and to retract the connection pin 98 out of engagement with the turntable sleeve.

Thereafter, a clamp solenoid valve 117 is energized to supply operating air to master valve 105. When the master valve 105 is opened, it permits the compressed air to pass through a throttle valve 118 and through the gate valve 113, which is normally open, into the base 10 of the apparatus where it is supplied to the top of the oil level in oil tanks 139 at either side of the base 10. This causes the oil to exert pressure on the lift table 32 which lifts the empty flask into engagement with the bottom of the blow plate 20. When the oil pressure in the lower part of the lift table cylinder 33 reaches 15 p.s.i. and the table is in clamping position, the master valve 106 is pushed open by pilot valve 119, which is operated by the back pressure in the lift table cylinder, to supply an increased clamping pressure up to 100 p.s.i.

to the cylinder 33. At the same time that master valve 105 is opened, a master exhaust valve 107 is closed.

Figure 21:
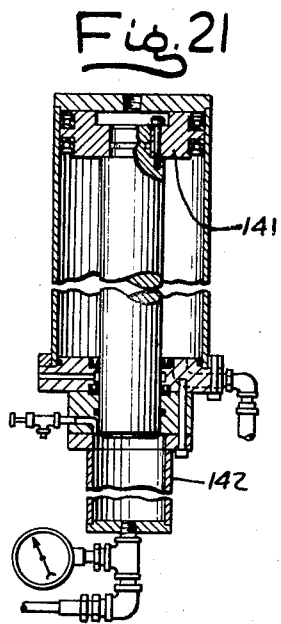
Fig. 21 is a sectional view of a booster mechanism for increasing the clamping pressure on the lift platform.

Thereafter, a clamp booster solenoid valve 130 is energized to release air from the lower part of a clamp booster cylinder 142, which is shown in greater detail in Fig. 21, and when the pressure switch 120 is actuated after the lift table 32 has completed its stroke, the clamp booster solenoid valve 121 is energized to cause the booster piston 141 to move down against the oil in the chamber and thereby to increase the clamping oil pressure to 500 p.s.i. This creates a clamping pressure of about 100,000 pounds. At this time a clamp booster pressure switch 131 closes. In the meantime, a prefill solenoid valve 132 has been energized to open the prefill master valve 102 and to close the exhaust valve 133 on top of the blow head. The prefilling operation continues while a prefill timer 175 times out in a manner to be hereinafter more fully described. Then a blow solenoid valve 134 is energized to open the main blow valve 101 so that air enters the sand transfer chamber 18 under full line pressure. Air pressure is continuously supplied to the sand transfer chamber while a blow timer 180 times out. Then a squeeze solenoid valve 136 is energized and opens the control valve 108 and closes the control valve 109 so that air enters the squeeze booster cylinder at the top 137 and is released at its lower end. The oil pressure in the squeeze booster oil cylinder 116 is increased to about 1000 p.s.i. to create a squeeze pressure of about 90,000 pounds inside the squeeze ram 34.

When squeezing of the mold is completed, a clamp timer times out and the clamp solenoid valve 117 is energized to reverse the master valves 105, 106 and 107 and the air, which was clamping the lift table 32 and filling the oil tank 139, is exhausted when the safety valve 140 opens the exhaust. The safety valve 140 is kept closed by pressure from the sand transfer chamber 18 and is released when the air pressure in that chamber has decreased to approximately 2 p.s.i. to prevent a sand blow out which might happen if the lift table were returned prematurely. While the blow timer 180 was timing out and the squeezing action taking place, the blow solenoid valve 134 was energized to close the air intake into the transfer chamber, to open the exhaust valve 133 and also to reverse the prefill master valve 102, thereby closing the prefill line. The air which did the prefilling and blowing of the core or mold escapes during the squeezing operation and the safety valve 140 is practically open when the squeezing operation is completed.

While the prefill timer 175 was timing out, the prefill solenoid valve 132 was energized to reverse its position. Similarly, while the clamp timer 170 was timing out, the clamp booster solenoid valve 121 and the clamp booster solenoid return valve 130 were reversed to release air out of the upper part of the clamp booster 141. The oil piston in cylinder 142 then returns and the oil pressure in the lift table cylinder 33 decreases. A master valve 144 then opens to return the oil from the lift table cylinder 33 into the booster cylinder 142. At the same time, a vibrator solenoid valve 145 is energized to open the air line to the vibrator 146, this operation taking place while the table is being lowered and continues until the table is down.

The squeeze booster solenoid valve 136 is maintained open as long as the table is on its way down. However, when the table is down, the solenoid valve 147 will admit air into the oil tank 148 and will release air out of the oil tank 149 and piston 176 will swing the sand transfer chamber 18 out to receive a new load of sand from the hopper 15. The index pin solenoid valve 129 will return the turntable piston 90 when the clamp timer times out, reversing the position of the index and connecting pins 97 and 98 when the table 32 is down, thereby disengaging the turntable 40 from the base 10 and engaging it with the turntable piston 90.

When a completed mold flask is picked off the turntable for stacking on the discharge conveyor, the lift piston 66 causes the stacking arm 55 to travel down and contact with the flask. When contact is made with the flask, the valves 151, 152 and 153 will be opened to admit air to both sides of the piston 66 and only the weight of the stacking arm 55 will force the piston 66 to go down and thereby force air out of the lower end of the cylinder 68 through valve 153 and back into the air line. At the same time, air enters the upper end of the cylinder 68 through valves 151 and 152.

The downward speed is controlled and restricted by flow control valves 155 and 156. When the stacking arm 55 contacts the flask, a limit switch 224 causes valves 152 and 153 to close so that no more air can enter the upper portion of the cylinder 68. Thus, the downward motion of the stacking arm 55 is stopped. At the same time, air leaves the cylinder 84 and the flask clamps 80 close in on the flask by spring pressure. A decrease of air pressure in the cylinder 84 will cause a pressure switch 159 to reverse the position of the valves 151, 152 and 153. Thus, air again enters the lower part of cylinder 68 through the valve 151. The piston 66 will thus raise the stacking arm 55 with the completed mold flask until the air has been completely exhausted from the upper portion of the cylinder 68, at which time the pressure switch 160 will cause reversal of the valves 152 and 153, thereby closing the intake of air to the valve 153 and causing a solenoid control valve 161 to swing the stacking arm 55 through 120° into stacking position adjacent the discharge conveyor 48 by virtue of the coupling to the piston 72.

After completion of the stacking arm's rotation through 120°, a pressure switch 162 causes the valves 151, 152 and 153 to reverse again and air enters the upper part of the cylinder 68 through the valves 151 and 152 and leaves the lower part of the cylinder through the valve 153. The stacking arm 55 carrying the flask then travels downward until the mold flask contacts the top flask of the stack or a bottom board, at which time the limit switch 224 will operate to close the valves 152 and 153 to halt further downward movement. At this time, the flask clamps 80 will open by virtue of air pressure entering the cylinder 84 through the control valve 158 and, after that, pressure switch 159 will reverse the valves 151, 152 and 153 to cause the piston 66 to again raise the stacking arm 55. When the piston 66 has reached its top-most stroke, the pressure switch 160 is again energized and reverses the valves 152 and 153, thereby reversing the solenoid control valve 161 and causing air to leave the cylinder 72 at one end while permitting air to enter the cylinder at the other end. The stacking arm 55 thus returns to starting position with open flask clamps ready to descend again to pick up the next completed core or mold. The stacking mechanism 55A on the loading side of the apparatus in Fig. 3 operates in a similar manner and its control system can be connected in parallel, though for reversed synchronized operation with the discharge stacking mechanism.

Figure 8:
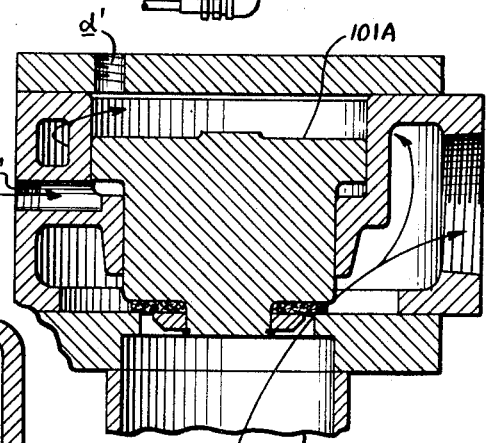
Fig. 8 is a sectional view of a valve mechanism for admitting pneumatic pressure to the sand charging mechanism in the apparatus of Fig. 3.
Figure 22:
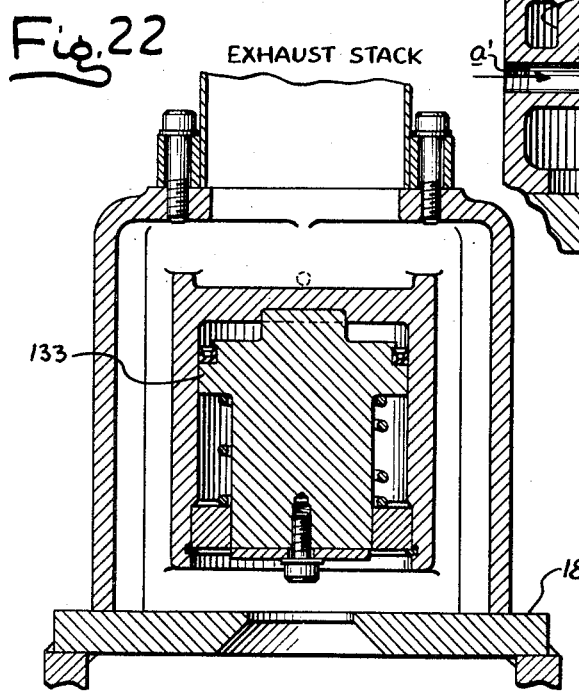
Fig. 22 is a sectional view of an exhaust valve for controlling the exhaust of pneumatic pressure from within the sand charging mechanism.

The details of the various valves operative in the fluid control system of Fig. 23 are best shown in other figures in the drawings. Hence, the details of blow valve 101 for the form of apparatus in Fig. 1 is shown in Fig. 7. Although the same type of blow valve may be adapted to the stationary sand transfer chamber of the form of apparatus in Fig. 3, a preferred form of blow valve 101A for this form of apparatus is shown in Fig. 8.

Figure 24:
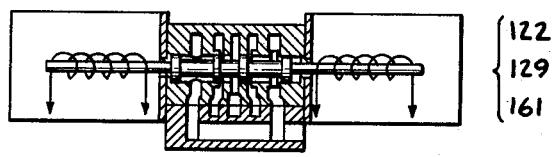
Fig. 24 is a sectional representation of one of a series of three double solenoid actuated four-way valves employed in connection with the present invention.
Figure 25:
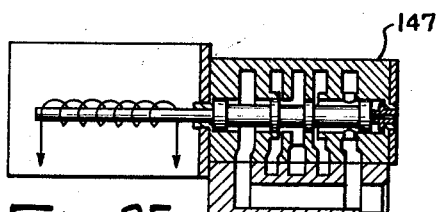
Fig. 25 is a sectional representation of a single solenoid actuated four-way valve for the fluid control system.
Figure 26:
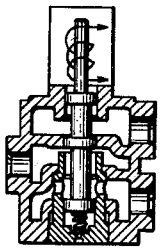
Fig. 26 is a section representation of one of a series of eleven solenoid actuated three-way valves for the fluid control system.
Figure 27:
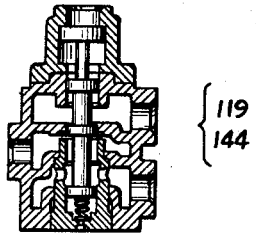
Fig. 27 is a sectional representation of one of two three-way pilot actuated valves for the fluid control system.
Figure 28:
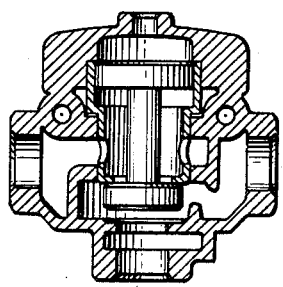
Fig. 28 is a sectional representation of one of seven multi-passage master valves for the fluid control system.

The double solenoid actuated four-way valve shown in Fig. 24 serves the purpose of valves 122, 129 and 161 in the fluid control system of Fig. 23. Likewise, the single solenoid actuated valve of Fig. 25 serves the purpose of the valve 147 in the fluid control system of Fig. 23. The master valves and control valves 102, 103 and 105 through 109 inclusive are of the type shown in Fig. 28. Fig. 26 shows the type of solenoid actuated three-way valve which performs the functions of valves 117, 121, 130, 132, 134, 136, 145, 151, 152, 153 and 158 in the system of Fig. 23; while Fig. 27 represents valves 119 and 144 in that system. Other valves diagrammatically shown in Fig. 23 and not otherwise shown in greater detail are conventional types which can readily be applied by those skilled in the art to perform the particular control function designated in the system.

Operation of the conventional valves shown in Figs. 24 through 28 is believed to be apparent to those skilled in the art when taken together with the description of the operation of the fluid portion of the control system in Fig. 23. The blow valve 101 of Fig. 7 is operated by air supplied from the valve 134 through port (a), which positions the valve body to open the main intake port (b) and admit full line pressure from the main air line 100. The air is supplied to the transfer chamber 18 through the passage (c) which ordinarily passes through the arms supporting the transfer chamber. It is apparent that some of the air will be bled off to the underside of the valve body as indicated by the arrows so that the valve body will close as soon as the valve 134 removes the opening air pressure from the port (a). A suitable air space is provided at the opposite end of the valve body to provide an air cushion which can exhaust through a check valve (d). The form of blow valve 101A shown in Fig. 8 operates in a similar manner.

*Electrical system*

Figure 29:
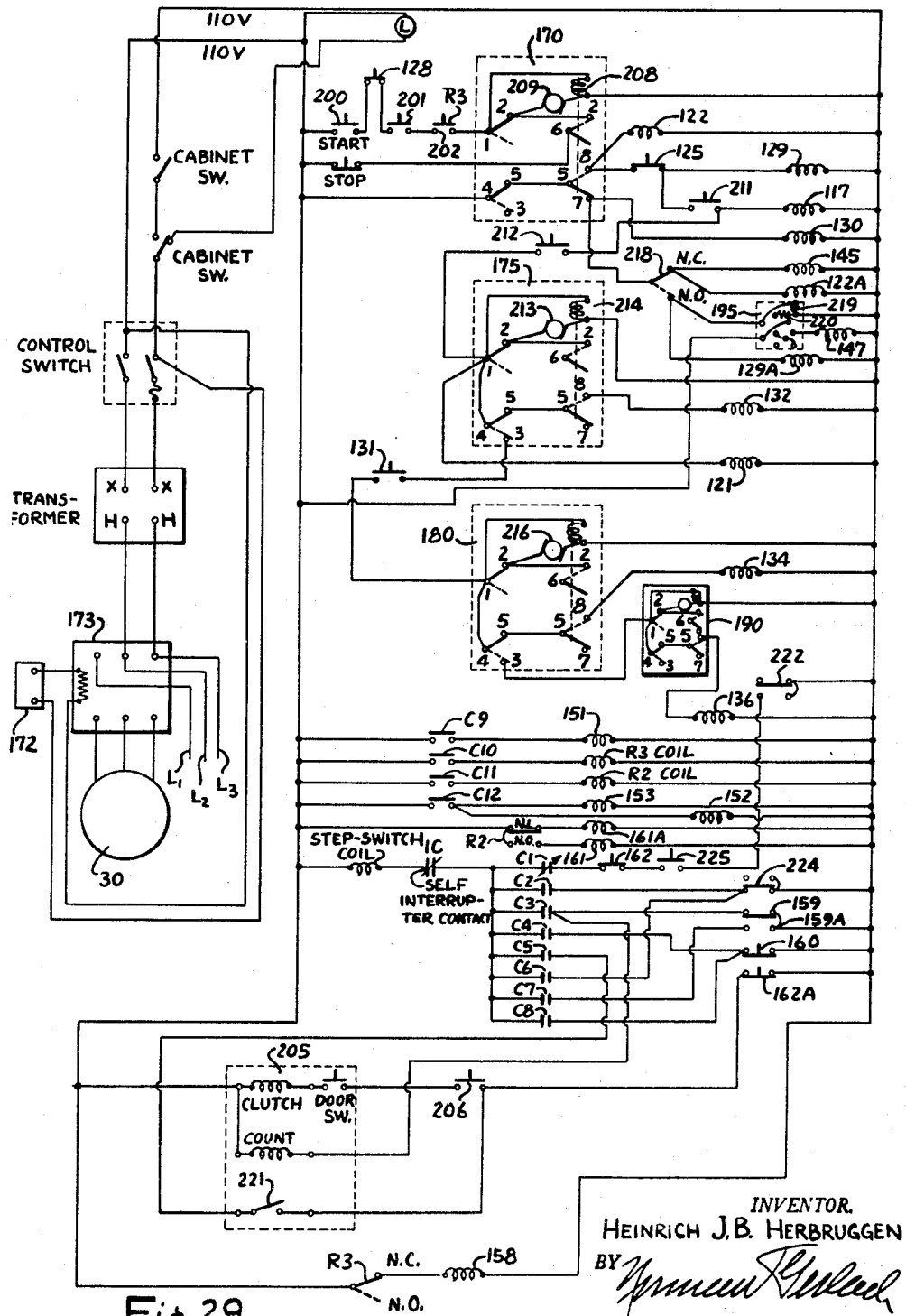
Fig. 29 is a schematic diagram of an electrical circuit for controlling the system shown in Fig. 23 to provide the predetermined sequential operation of the form of apparatus in Fig. 1.

Referring now more particularly to the electrical portion of the control system for the apparatus of Fig. 1, which is diagrammatically shown in Fig. 29, the control potential is supplied to the circuit through a push button start switch 200 which starts the complete operation, provided a flask is placed upon the receiving arms 42 of the turntable 40 to depress a flask switch 201. Operation of the turntable 40 is also conditioned upon completing the circuit through an index pressure switch 128 and relay contacts 202. When the index pressure switch 128 is closed, the turntable piston 90 is in starting position ready to turn an empty flask into the work area of the apparatus, and when the relay switch contact 202 is closed, the flask clamps 80 of the stacking arm 55 are open and ready to receive a completed mold or core from the apparatus. Normally, the stacking arm will be returning from a stacking operation with the flask clamps 80 open and conditioned to receive the next completed mold being discharged from the apparatus when the push button 200 is depressed, and the stacking mechanism 50 will begin operating as soon as a completed mold is swung in to be picked up.

The circuit includes a counter device 205 which operates after a predetermined number of molds have been blown, for example, after the eighth mold is completed, to stop the stacking operation as the eighth flask is swung out for stacking. The counter control enables an operator to scrape off the mold flask to provide a flat supporting surface for resting the flask on a bottom board to begin another stack. When the lower side of the mold has been shaved off, a release button 206 can be depressed and the stacking mechanism 50 will continue its operation by lowering the completed mold onto a bottom board.

Thus, when the start button 200 is depressed it will energize the clutch solenoid 208 of the clamp timer 170 and start the clamp timer motor 209. The energized timer clutch coil 208 closes holding contacts 6—2 of the clamp timer and the start push button 200 can be released. When the holding contacts 6—2 close, contacts 5—8 also close and contacts 5—7 open. Closing of contact 5—8 energizes the solenoid 122 which controls the turntable piston 90 and the turntable 40 is swung 120° to position an empty flask or core box into blowing position within the work area. After completion of this operation, the pressure switch 125 closes to energize the index solenoid 129 which in turn causes the index pin 97 to lock the turntable 40 in the attained position and to drop out the connecting pin 98.

In the meantime, the sand transfer chamber 18 is returned from a filling position beneath the supply hopper 15 to a blowing position in the work area and closes a switch 211 to energize the clamp solenoid 117. This activates the lift table 32 which is raised to position the empty flask and clamp it against a drag pattern carried by the blow plate 20. The speed of the lift can be adjusted to prevent slamming. The agitator drive motor 30 is controlled by pressure switch 172 which will start the motor as soon as the lift table 32 is raised. The pressure switch 172 activates the motor starter control 173. After the empty flask is clamped in blowing position, an oil tank differential switch 212 will close as soon as the clamping pressure approaches the line pressure (preferably 100 p.s.i.) to energize the prefill timer 175. The timer switch 5—8 closes energizing the prefill solenoid 132 and at the same time the clamp booster solenoid 121 is energized. Opening of the contact 5—7 of the clamp timer 170 deenergizes the clamp booster return solenoid 130 and the clamp booster 141 builds up the hydraulic clamping pressure from 100 p.s.i. to approximately 500 p.s.i.

The prefill timer 175 times out after approximately one second, opening contact 4—5 and 1—2 and closing contact 4—3. Opening of the contact 1—2 stops the timer motor 213 and opening of the contact 4—5 deenergizes the prefill solenoid 132. Contact 5—8 stays closed because the timer clutch coil 214 remains energized. Closing of the prefill timer contact 4—3 permits the blow timer 180 to start, provided the pressure switch 215 has been closed by the increased oil pressure of 500 p.s.i. in the table cylinder 33. When contact 5—8 of the blow timer 180 closes to energize the blow solenoid 134, the prefilling operation is terminated and the actual blowing of sand begins. The blowing operation consumes another one to two seconds in the timer cycle and after that the contact 1—2 and 4—5 of the blow timer 180 as well as the contacts 4—3 close to deenergize the blow solenoid 134 and the blow timer motor 216.

A time interval of approximately two seconds exists between the stopping of the blow timer 180 and the stopping of the clamp timer 170 and is sufficient to permit the squeeze ram 34 to travel up and pack the sand against the pattern and then return. This is accomplished by a squeeze timer 190 which will start when contacts 4—3 of the blow timer 180 close to energize the squeeze solenoid 136 through contacts 5—8 of the squeeze timer 190. The squeeze solenoid 136 is energized for approximately one second, after which the squeeze timer 190 opens contacts 1—2 and 4—5 to deenergize the squeeze solenoid 136 and the clamp timer 170 times out. Contacts 1—2 and contacts 4—5 of the squeeze timer 190 then close and contacts 5—8 of the squeeze timer open. After the squeezing and drawing operation, the clamp timer 170 times out and opens contacts 1—2 and 4—5. Opening of contacts 1—2 deenergizes the timer clutch coil 208 to open contacts 6—2 and 5—8 and to close contacts 5—1. When contacts 6—2 open, the timer motor 209 stops and clamp timer 170 resets to again close contacts 1—2 and 4—5 and to condition them for the next operation. Opening of the contacts 5—8 of the clamp timer deenergizes the clamp solenoid 117 and the lift table 32 is lowered. The prefill and blow timers are interrupted and reset at substantially the same time and clamp booster solenoid 121 is deenergized. The squeeze timer 190 also resets at the same time. Closing of the contacts 5—7 energize the clamp booster return solenoid 130 and the clamping pressure is lowered from 500 p.s.i. to 100 p.s.i. to deenergize the clamp solenoid 117. Eventually, the clamp pressure is decreased to zero.

Closing of the contacts 5—7 of the clamp timer 170 energizes a vibrator solenoid 145, provided the table switch 218 remains closed. This operation continues until the table opens the closed table switch contact and closes the open switch contact. In the meantime, the turntable piston return solenoid 145 is energized to cause the piston 90 to return to a starting position. When the table 32 is lowered, the index solenoid 129 is energized to retract the index pin 97 and to re-engage the connecting pin 98 and thereby condition the apparatus for the next cycle of operation.

When the open table switch contact closes, a fill timer 195 is energized and this in turn energizes solenoid 147 and causes sand transfer chamber 18 to swing out to receive a new charge of sand from the supply hopper 15. After a pre-set time determined by the fill timer 195, the transfer chamber 18 is returned to the work area. The fill timer 195 operates in the same manner as the other timers and contacts 1—2 and 4—5 open to deenergize the timer motor 220. The timer coil 219 remains energized although solenoid 147 is deenergized. The fill timer 195 resets when the clamp timer 170 opens contacts 5—7 for the next operation.

When the table 32 is lowered, the open table switch contact 222 is closed and the completed mold or core is ready to swing out of the work area and be discharged while an empty flask is positioned into the work area. Closing of the table switch contact 222 conditions the stacking mechanism 50 for operation. When the operator pushes the start button 200, a completed mold comes out and the mold itself closes the limit switch 225. Closing of the pressure switch 162 indicates that the stacking arm 55 is in the receiving position and a conventional step-switch then operates, tripping from contact C–1 to C–2. The step switch has eight steps proceeding from contact C–1 to C–8 and at each step the appropriate solenoid valves are energized or deenergized, either directly by the switches C–9 to C–12 or by relays R–2 or R–3. The step-switch thus assures a definite sequence of operation for the stacking mechanism 50.

When the completed mold moves into position to close the mold switch 225, the step switch opens contact C–1 and closes contact C–2. Thereafter, when the limit switch 224 closes, the step switch moves to contact C–3; then, after pressure switch 159 closes, the step switch moves from contact C–3 to contact C–4; then, after pressure switch 160 closes the step switch moves from contact C–4 to contact C–5; then, after pressure switch 162 closes, the step switch moves from contact C–5 to contact C–6; then, after limit switch 224 again closes, the step switch moves from contact C–6 to contact C–7; then, after pressure switch 159A closes, the step switch moves from contact C–7 to contact C–8; and after pressure switch 160 again closes, the step switch recycles from contact C–8 to contact C–1 to condition the circuit for a new cycle of operation.

The limit switch 224 which causes the step-switch to move from contact C–6 to contact C–7 is operated by expansion of the counter-balance spring at the end of the cable 58 which supports the stacking arm 55. The spring expands when the flask closes on the stack to operate the limit switch 224 which in turn activates the step switch to deenergize the solenoid 153. This prevents the release of air from the bottom of the cylinder 68 and isolates the top of the cylinder so that downward movement of the piston 66 is stopped immediately.

As prveiously noted, every eighth operation, the counter switch 221 opens and, although the step switch contact C–5 closes and the pressure switch 162 closes, the step switch will not move to the next succeeding contact C–6. This enables the operator to scrape sand off the lower edge of the flask or core box, after which the auxiliary push button 206 can be depressed and the counter causes the step switch to continue to operate and to activate the stacking mechanism 50 to lower the completed mold onto a bottom board and thereafter to return the stacking arm 55 into mold receiving position. The step switch thus assures a complete cycle of operation by transmitting incoming signals from limit switch 224 and pressure switches 159, 159A, 160 and 162 thereby providing a correct sequence in the cycle of operation.

As previously indicated, the fluid and electrical control system for automatically operating the form of apparatus in Fig. 3 is basically the same as the system for operating the form of apparatus in Fig. 1 with the principal exception that the portion of the system which controls the stacking mechanism 50 must be duplicated for the transporting mechanism 50A and coupled to the remainder of the system in such a manner that the transporting mechanism will operate in reverse relation to the stacking mechanism, picking up an empty core box or flask from the feed conveyor 99 and loading it on the turntable 40 while the stacking mechanism is removing a completed core or mold from the turntable and depositing it on a stack on the discharge conveyor 48. In addition, the control system for the form of apparatus in Fig. 3 will include conventional solenoid-actuated valves to operate the gate 16 to permit filling of the transfer chamber 18 from the supply hopper 15 in proper sequence in the cycle of operation.

Figure 30:
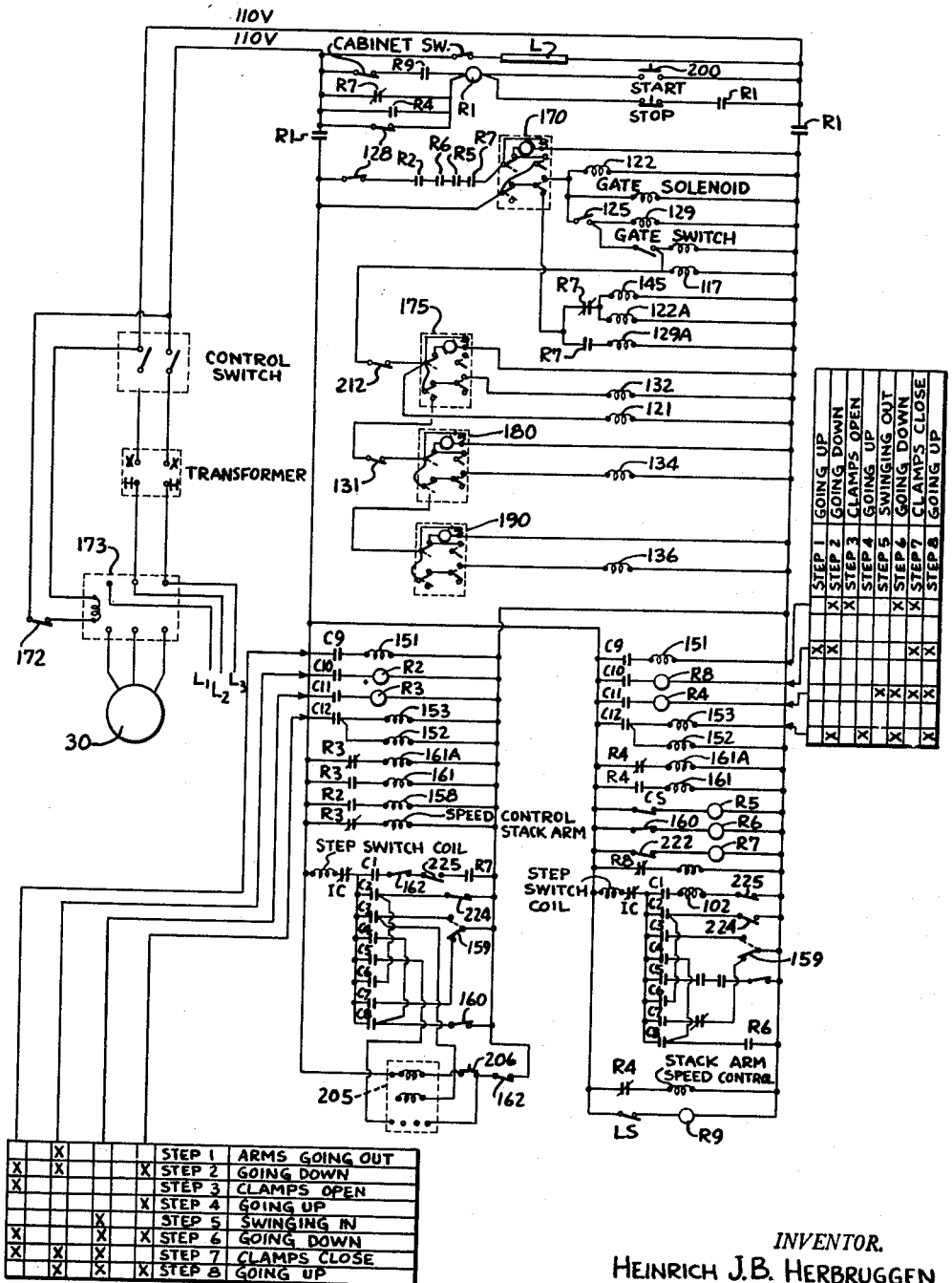
Fig. 30 is a schematic illustration of an electrical circuit for controlling a modified fluid system to provide the predetermined sequential operation of the form of apparatus in Fig. 3.

The duplication of the valves and operating pistons in the fluid portion of the control system of Fig. 23 to operate an additional stacking mechanism as a transporting mechanism is believed apparent in Figs. 24, 26, 27 and 28. Similarly, the duplication of the portion of the electrical control system of Fig. 29 which controls the stacking mechanism and its synchronization in the system is likewise believed to be readily apparent with reference to Fig. 29 and one form of such a system is schematically shown in Fig. 30 of the drawings. Since the operation is essentially the same as in Fig. 29, with the exception of the duplication of the stacking mechanism control and its reverse operation to perform a transporting and loading function, it is not deemed necessary to describe the system of Fig. 30 or its operation in greater detail, it being sufficient that those skilled in the art will readily recognize its similarity to the system in Fig. 29 and the manner in which it may be adapted to automatically control the sequential operation of the form of apparatus in Fig. 3 of the drawings.

Figure 32:
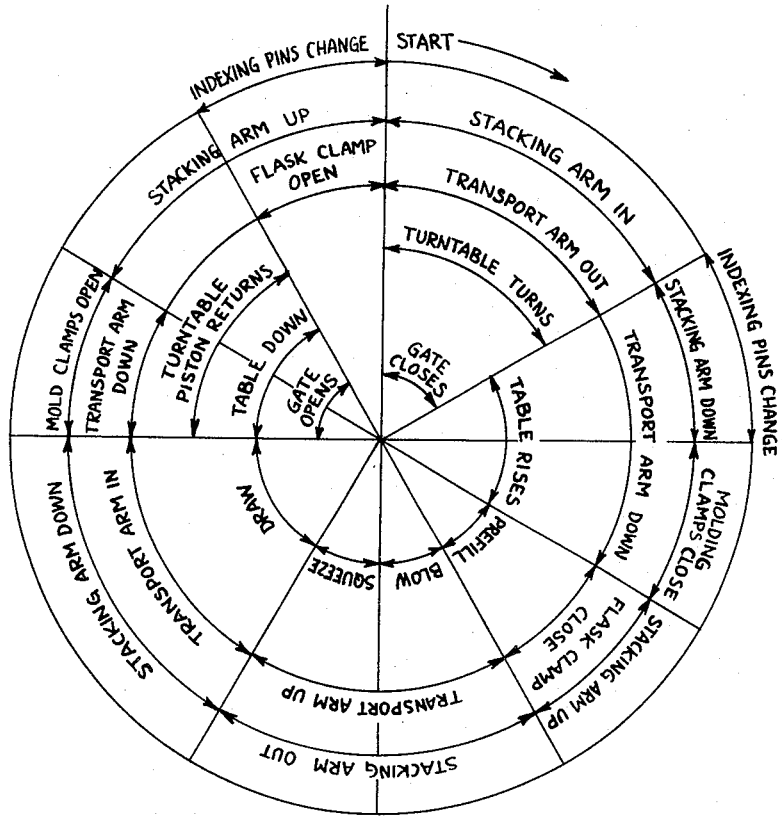
Fig. 32 is a time cycle diagram illustrating the sequential operation of the form of apparatus in Fig. 3.
Figure 31:
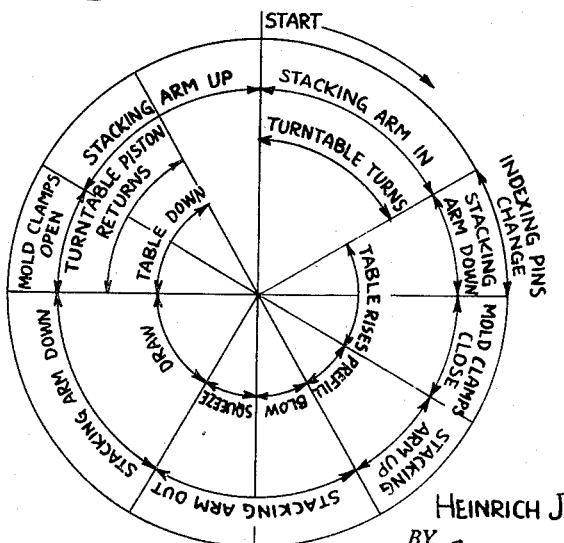
Fig. 31 is a time cycle diagram illustrating the sequential operation of the form of apparatus in Fig. 1.

The complete cycle of operation for each form of apparatus shown in Figs. 1 and 3 is diagrammatically illustrated respectively in the time cycle charts of Figs. 31 and 32. In these charts, the clamps 80 on the stacking mechanism 50 are identified as "mold" clamps to distinguish them from the "flask" clamps 80A on the transporting mechanism 50A. The time cycle travels clockwise about each chart and is intended to indicate the sequential operation of the principal components of the apparatus as predetermined by the control system in accordance with this invention.

Thus, there has been provided a stack molding apparatus and system which, in one preferred form, can be operated in a predetermined sequence after being manually loaded to automatically produce and stack a plurality of completed cores or molds and which, in another preferred form, can be operated in a predetermined sequence to automatically load and discharge on a stack a plurality of completed cores or molds in rapid succession. Either form of apparatus can be selectively operated for a single cycle or for a multiplicity of cycles and can be readily adjusted to meet the requirements of different cores or molds. The apparatus and control system are simple and efficient in operation and in the utilization of equipment and space and provides automatic stack molding at a relatively high rate of production.

I have shown and described what I consider to be the preferred embodiments and forms of my invention, along with suggested modifications, and it will be obvious to those skilled in the art that other changes and modifications may be made without departing from the scope of my invention as hereinbefore described and as hereinafter defined by the appended claims.

I claim:
1. In a core or mold blowing apparatus having a fluid-actuated sand charging mechanism including meants for prefilling a core box or flask with sand at a reduced fluid pressure and means for thereafter completing the said charging operation at an increased fluid pressure, a fluid-actuated mechanism for presenting and removing the core box or flask in operative sand blowing relation to the charging mechanism, a fluid-actuated lift mechanism for clamping the core box or flask in operative sand blowing position, a fluid-actuated squeezing mechanism, and a fluid-actuated mechanism for stacking the completed core or mold, a system for automatically activating each of said mechanisms in predetermined sequence comprising, a plurality of conduits for selectively supplying fluid from a source of operating pressure to each of said mechanisms and including valves for controlling the flow through said conduits for prefilling the core box or flask, additional valves in said conduits which are selectively adjustable to a plurality of arrangements for changing the flow through the conduits from the source to the mechanisms, and means for automatically controlling the adjustment of all of said valves in predetermined timed relation to sequentially activate each of said mechanisms in a predetermined manner for a complete cycle of operation including receiving an empty core box or flask, clamping the box or flask to receive a charge of sand, charging the box or flask with sand, squeezing the charge of sand against a pattern and then discharging and stacking the completed core or mold.

2. In a molding apparatus having a frame including a base and a vertical column adapted to support a sand charging mechanism in operative sand blowing relation to an empty core box or flask located in a work area surmounting the base, a turntable mechanism for simultaneously presenting an empty core box or flask into the work area while removing a completed core or mold from the work area including a turntable sleeve secured to and rotatable with the turntable and rotatably journalled on the column, a plurality of circumferentially spaced and radially extending arms carried by said sleeve, successive pairs of said arms defining a marginal supporting surface corresponding to the marginal wall boundary of a core box or flask, said pairs of arms being so spaced that while one pair of arms is in the work area, two other pairs of arms are positioned external to the work area and adjacent a flask loading and a flask discharge station respectively, means for selectively rotating said sleeve and arms in predetermined angular increments to simultaneously present an empty core box or flask into the work area while removing a completed core or mold from the work area, said sleeve rotating means including another sleeve coaxially disposed on said column and having a crank arm extending radially therefrom, a fluid motor having a horizontally reciprocable piston rod coupled to said crank arm to rotate said other sleeve on the column, said turntable sleeve having a radial flange adjacent said other sleeve with a plurality of circumferentially spaced axial apertures therethrough, a fluid-acuated piston motor mounted on the crank arm on said other sleeve with its piston rod disposed for vertical reciprocation along an axis adapted to intersect an aligned flange aperture, said piston rod adapted to coact as a connecting pin to selectively engage an aligned flange aperture and cause the turntable sleeve to rotate as a unit with said other sleeve in response to reciprocation of said horizontally disposed piston rod.

3. A stacking mechanism for transporting a core box or flask to or from the work area of a core or mold blowing apparatus comprising, a base, a hollow vertical guide mounted on the base for rotation on a vertical axis, means for selectively rotating said guide, a carriage mounted for vertical movement along said guide, means for selectively moving the carriage vertically along the guide and including, a pulley wheel having a shaft disposed transversely for rotation within said hollow guide and adapted for limited vertical travel therein, a cage enclosing said pulley wheel, vertically reciprocable means coacting between the base and the pulley wheel cage to move the cage vertically within the guide, a flexible connection between the carriage and the base of the guide and extending about the pulley wheel, and counterbalancing means coacting between the base of the guide and the flexible connection, a stacking arm carried by the carriage and adapted to support a core box or mold flask, clamping means on the stacking arm for releasably engaging a core box or mold flask, and means for selectively activating said clamping means, whereby a core box or mold flask may be transported vertically along the guide and rotated into or out of the work area.

4. The turntable mechanism of claim 2 wherein turntable holding means includes a second fluid-actuated piston motor fixed adjacent to the column in circumferentially spaced relation from said connecting pin piston rod with its piston rod disposed for vertical reciprocation along an axis adapted to intersect an aligned flange aperture and forming an indexing pin for holding the turntable sleeve stationary, and means for alternately actuating said index pin and connecting pin piston rods.

5. The stacking mechanism of claim 3 wherein said guide rotating means, said carriage moving means and said clamping means are each fluid-actuated and wherein said mechanism includes control means for automatically activating each of said fluid-actuated means in a predetermined sequence to produce a complete cycle of operation, whereby a core box or flask is automatically picked up by the stacking arm, transported along the vertical guide, rotated into or out of the work area and released in the work area or on a stack to load empty core boxes or flasks into the apparatus or to unload and stack completed cores or molds from the apparatus respectively.

6. The stacking mechanism of claim 5 wherein said control means includes a plurality of solenoid-actuated adjustable valves for controlling the application of operating fluid to each of said fluid-actuated means and wherein said control means also includes electrical means coacting in the mechanism at the limits of travel of the several components to automatically adjust said valves and selectively condition the mechanism for each succeeding sequential operation in the cycle of operation.

References Cited in the file of this patent

UNITED STATES PATENTS

| | | |
|---|---|---|
| 1,707,411 | Nicholls | Apr. 2, 1929 |
| 2,191,451 | Campbell | Feb. 27, 1940 |
| 2,349,219 | Wood | May 16, 1944 |
| 2,415,997 | Eldred | Feb. 18, 1947 |
| 2,757,424 | Daniel et al. | Aug. 7, 1956 |
| 2,759,229 | Magnuson et al. | Aug. 21, 1956 |
| 2,783,509 | Miller | Mar. 5, 1957 |

FOREIGN PATENTS

| | | |
|---|---|---|
| 728,278 | Great Britain | Apr. 13, 1955 |
| 1,121,958 | France | May 14, 1956 |